United States Patent
Cornett et al.

(10) Patent No.: US 7,451,989 B1
(45) Date of Patent: Nov. 18, 2008

(54) SEAL

(75) Inventors: Kenneth W. Cornett, Ivoryton, CT (US); D. Gregory More, Middletown, CT (US); Stephen S. Stone, East Haven, CT (US); Paul A. Dudzinski, East Berlin, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 224 days.

(21) Appl. No.: 11/338,975

(22) Filed: Jan. 25, 2006

Related U.S. Application Data

(60) Provisional application No. 60/647,081, filed on Jan. 25, 2005.

(51) Int. Cl.
*F16L 15/02* (2006.01)

(52) U.S. Cl. .......... 277/626; 277/644; 277/654

(58) Field of Classification Search ........ 277/635, 277/636, 626, 644, 650, 652, 654; 415/135–136, 415/138–139, 173.3, 174.2
See application file for complete search history.

(56) References Cited

U.S. PATENT DOCUMENTS

| 3,761,102 | A | | 9/1973 | Nicholson |
| 3,975,114 | A | * | 8/1976 | Kalkbrenner ............ 415/210.1 |
| 4,795,174 | A | * | 1/1989 | Whitlow ................. 277/654 |
| 6,193,240 | B1 | | 2/2001 | Johnson et al. |
| 7,090,224 | B2 | * | 8/2006 | Iguchi et al. ............. 277/603 |
| 2006/0255549 | A1 | | 11/2006 | Amos et al. |

FOREIGN PATENT DOCUMENTS

GB 2303888 A 3/1997

* cited by examiner

*Primary Examiner*—Vishal Patel
(74) *Attorney, Agent, or Firm*—Bachman & LaPointe, P.C.

(57) ABSTRACT

A seal has first and second spring elements each having first and second surfaces along a bellows cross-section and extending between first and second edges. A spreader is secured to an endplate between the first edges of the first and second elements to capture first edge portions of the first and second elements.

24 Claims, 3 Drawing Sheets

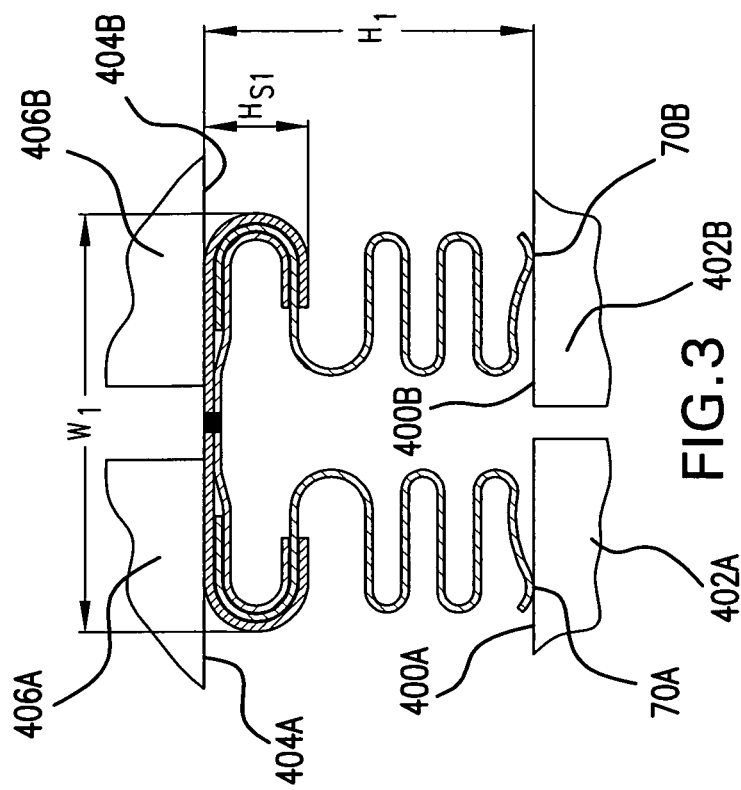
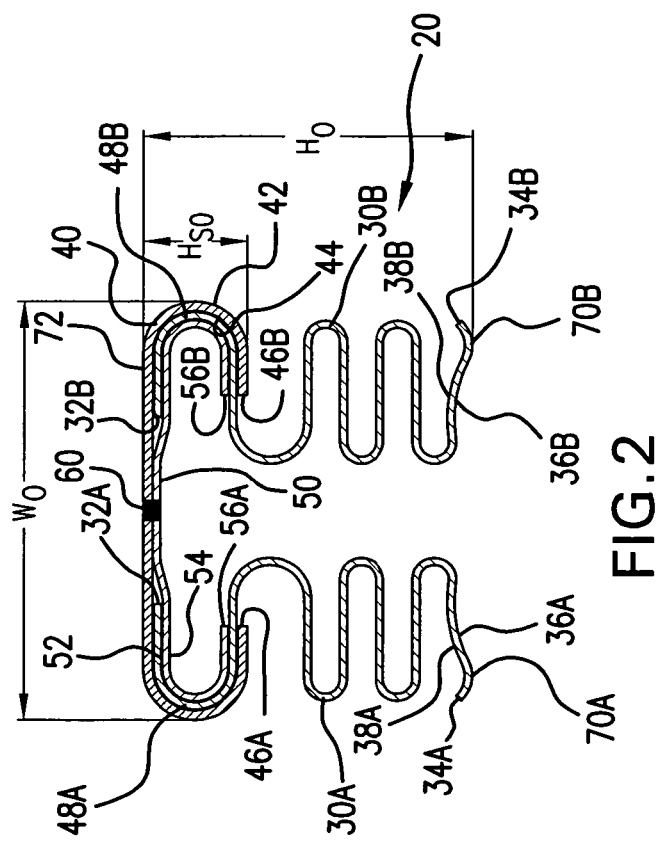

SEAL

CROSS-REFERENCE TO RELATED APPLICATION

Benefit is claimed of U.S. Patent Application Ser. No. 60/647,081, filed Jan. 25, 2005, and entitled "Seal", the disclosure of which is incorporated by reference herein as if set forth at length.

BACKGROUND OF THE INVENTION

The invention relates to metallic seals. More particularly, the invention relates to linear seals.

SUMMARY OF THE INVENTION

One aspect of the invention involves a seal having first and second elements, each having first and second surfaces along a bellows cross-section and extending between first and second edges. A spreader is secured to an end plate between the first edges of the first and second elements to capture first edge portions of the first and second elements.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2 is a cross-sectional view of the segment of FIG. 1, taken along line 2-2.

FIG. 3 is a view of the segment of FIG. 1 mounted in a first environment.

Like reference numbers and designations in the various drawings indicate like elements.

DETAILED DESCRIPTION

Figure 1:
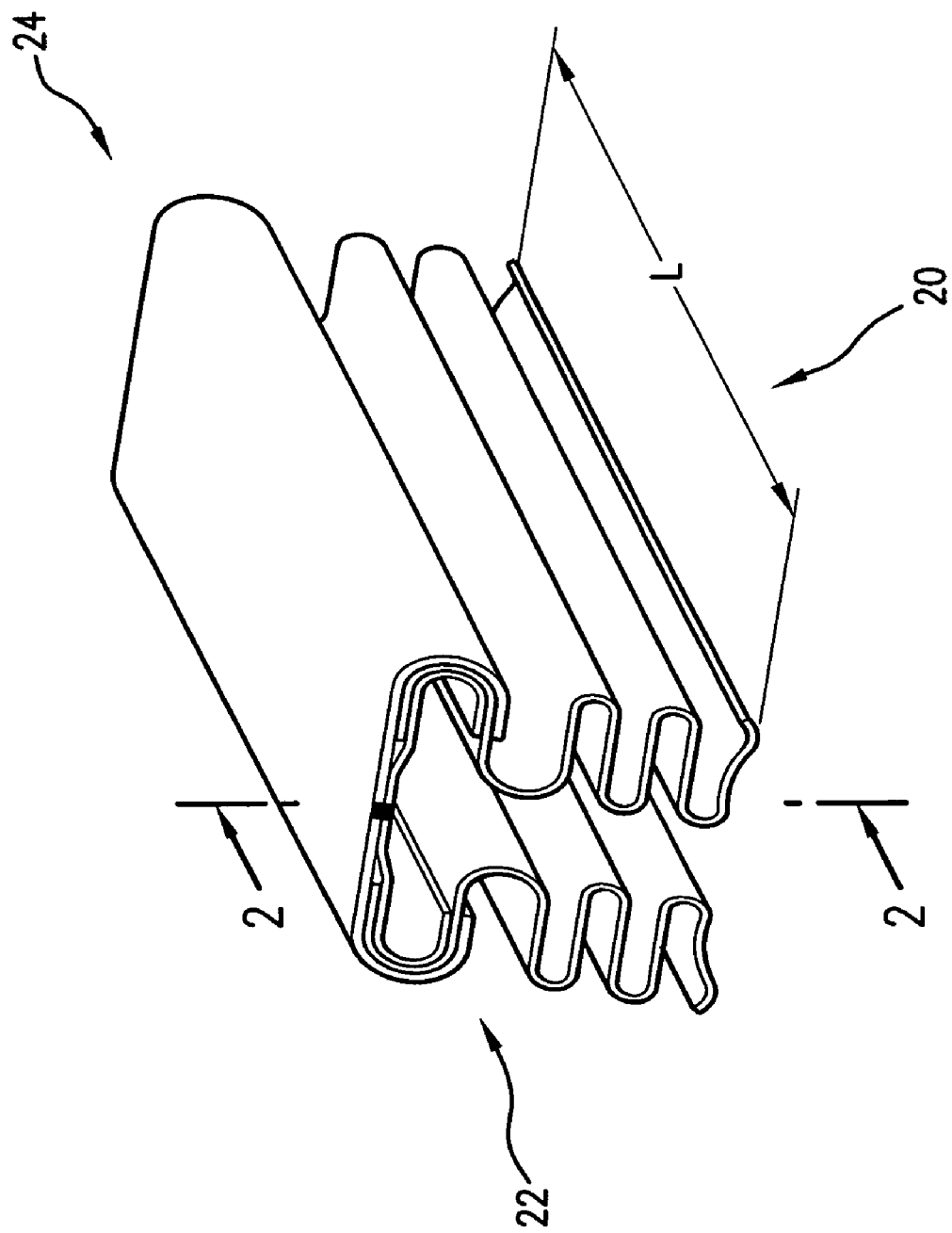
FIG. 1 is a view of a seal segment.

FIG. 1 shows a seal 20 which may be formed as a straight segment extending for a length L between first and second segment ends 22 and 24. The seal includes first and second bellows-like spring elements 30A and 30B (FIG. 2), each having a bellows cross-section extending between a first end (of the section; edge of the spring) 32A; 32B and a second end 34A; 34B. In the exemplary embodiment, the bellows section (viewed as a transverse section in FIG. 2) extends for just over three cycles between the ends 34A; 34B and 32A; 32B. Each element 30A; 30B has a first surface 36A; 36B and a second surface 38A; 38B. A relaxed seal height is shown as $H_0$.

The seal further includes an endplate or heat shield element 40 whose exemplary cross-section is substantially obround with a gap along one of two legs. The exemplary shield 40 has a relaxed width $W_0$ and a relaxed height $H_{S0}$. The shield 40 has outboard and inboard surfaces 42 and 44, respectively, extending between first and second longitudinal edges 46A and 46B. The shield 40 captures first end portions 48A and 48B of the springs 30A and 30B, with the shield inboard surface 44 contacting the surfaces 38A and 38B therealong. To retain the springs 30A and 30B to the shield, a spreader 50 is positioned concentrically within the shield 40. The spreader 50 has outboard and inboard surfaces 52 and 54 extending between first and second edges 56A and 56B.

In the exemplary embodiment, the cross-section of the spreader 50 is a near obround with a gap along one leg approximately coextensive with the shield gap and a central bulge along the other leg permitting local contact of the spreader and shield between the spring first edges 32A and 32B. Along this region of contact, one or more welds 60 secure the spreader and shield. The spreader may be in a state of strain so that contact between its outboard surface 52 along the portions 48A and 48B securely retains the springs to the shield.

In the exemplary embodiment, along the first surfaces 36A and 36B of each of the springs, a sealing portion 70A; 70B near the second edge 34A; 34B may contact and seal with surfaces of one or more environmental elements. For example, the portions 70A and 70B may seal with the same environmental element or two different environmental (e.g., surfaces 400A and 400B of elements 402A and 402B (FIG. 3)). Similarly, an opposite end portion 72 of the shield 40 may seal with surfaces 404A and 404B of one or more other environmental elements 406A and 406B. In its installed/compressed state, the seal has an overall height $H_1$ which may be slightly less than $H_0$. The shield width $W_1$ and height $H_{S1}$ may be essentially unchanged.

Figure 4:
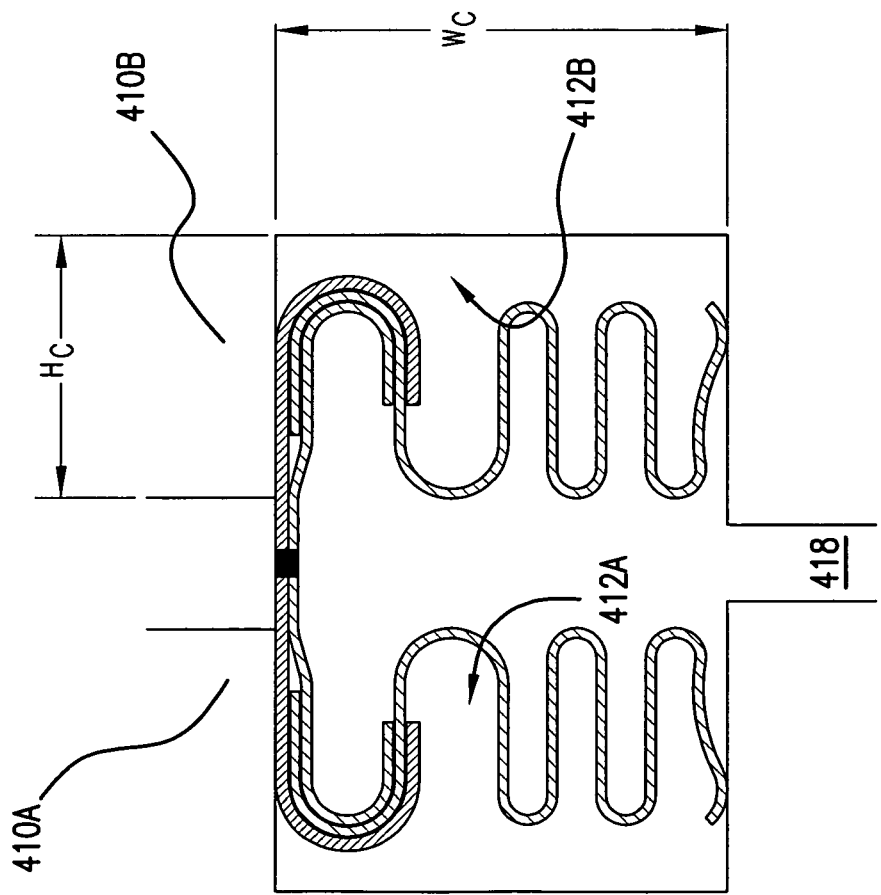
FIG. 4 is a view of the segment of FIG. 1 mounted in a second environment.

Alternatively, the seal may be positioned to seal between two environmental elements 410A and 410B (FIG. 4), with the springs 30A and 30B each compressed within an opposing slot 412A; 412B of one of the elements and the shield and spreader spanning a gap 418 between those elements.

The springs 30A and 30B and/or the shield 40 and spreader 50 may each be provided with vent apertures to provide a desired degree of venting. The spreader may be longitudinally coextensive with the shield. Alternatively, they may have different extents. For example, the spreader may be formed as a series of individual spreader elements longitudinally spaced along the shield. In the exemplary embodiment, the seal is a linear segment with the shield and springs extending between longitudinal ends at a pair of parallel planes. Other configurations are possible. These may include non-linear configurations (e.g., circular seals wherein FIG. 2 may represent a radial cross-section). Also, even among linear variations, the shield and springs may be other than longitudinally coextensive.

In an exemplary method of manufacture, the individual components are separately formed (e.g., by processes including roll forming). The springs (or at least their first portions 48A and 48B) may be compressed and inserted into adjacent portions of the shield 40. The spreader(s) 50 may then be compressed and inserted within the shield. The spreader(s) may then be welded in place (e.g., via tack welding, laser welding, or the like).

Advantageous materials for each of the components may be application-specific. Exemplary materials are nickel- and cobalt-based superalloys. One combination involves a nickel-based superalloy for the springs for resilience and a cobalt-based superalloy for the heat shield and spreader (providing wear resistance for the former and weld compatibility for the latter).

Figure 5:
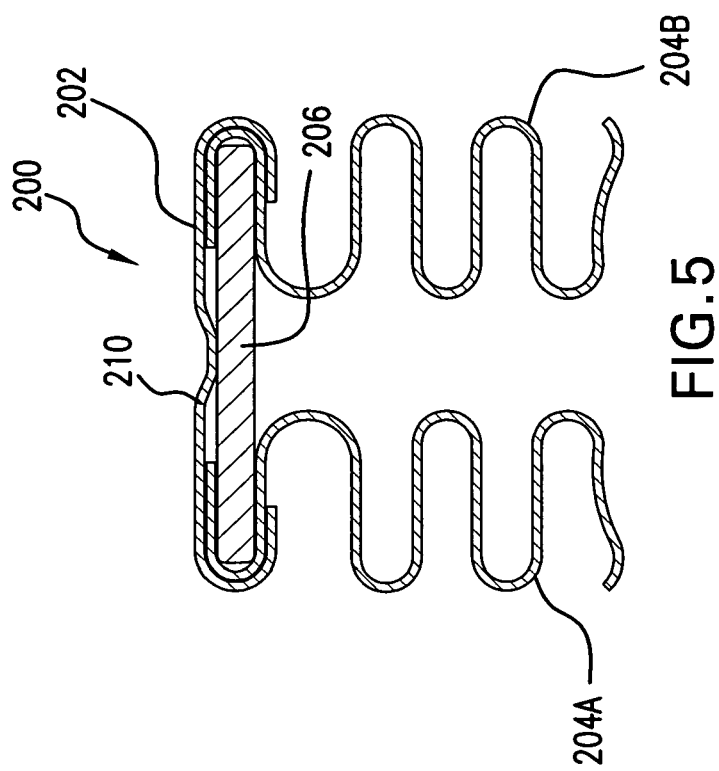
FIG. 5 is a cross-sectional view of an alternate seal segment.

FIG. 5 shows an alternate seal 200 having a shield 202, springs 204A and 204B, and a spreader 206. The exemplary spreader 206 is formed as a flat strip having a thickness substantially greater than the thicknesses of the shield and springs (e.g., 3-6 times greater). The shield has a depressed region 210 in the gap between adjacent spring edges for contacting and being welded to the adjacent surface of the spreader.

One or more embodiments of the present invention have been described. Nevertheless, it will be understood that various modifications may be made without departing from the spirit and scope of the invention. Accordingly, other embodiments are within the scope of the following claims.

What is claimed is:

1. A seal comprising:
    a first element having first and second surfaces along a bellows cross-section and extending between a first edge and a second edge;
    a second element having first and second surfaces along a bellows cross-section and extending between a first edge and a second edge;
    an end plate, in cross-section the end plate having first and second end portions each defining a bend, first and second edges with a gap therebetween, and a leg connecting the first and second end portions opposite the gap; and
    a member secured to the end plate between the first edges of the first and second elements, in cross-section, the member having first and second ends so that:
        a portion of the first element extending from the first edge of the first element is captured between the first end of the member and the first end portion of the end plate; and
a portion of the second element extending from the first edge of the second element is captured between the second end of the member the second end portion of the end plate.

2. A combination comprising:
    one or more first environmental components;
    one or more second environmental components; and
    the seal of claim 1,
wherein:
    the first and second elements are compressed between the one or more first environmental components and the one or more second environmental components.

3. A combination comprising:
    a first environmental component;
    a second environmental component;
    a third environmental component; and
    the seal of claim 1,
wherein:
    portions of the first and second elements proximate the second edges thereof are engaged to the first environmental component;
    a first lateral portion of the end plate is engaged to the second environmental component to hold the first element under compression; and
    a second lateral portion of the end plate is engaged to the third environmental component to hold the second element under compression.

4. The seal of claim 1 wherein:
the member is welded to the end plate.

5. The seal of claim 1 wherein:
the first and second elements and the combined end plate and member each have an array of apertures to provide venting.

6. The seal of claim 1 being a straight segment.

7. A seal comprising:
    a first element having first and second surfaces along a bellows cross-section and extending between a first edge and a second edge;
    a second element having first and second surfaces along a bellows cross-section and extending between a first edge and a second edge; and
    an end member capturing first portions of the first and second elements but not welded thereto, the end member comprising:
        an end plate, in cross-section the end plate having first and second end portions, first and second edges defining a gap therebetween, and a leg connecting the first and second end portions opposite the gap; and
        a member secured to the end plate between the first edges of the first and second elements, in cross-section, the member having first and second ends so that:
            the first portion of the first element extending from the first edge of the first element is captured between the first end of the member and the first end portion of the end plate; and
            the first portion of the second element extending from the first edge of the second element is captured between the second end of the member and the second end portion of the end plate.

8. The seal of claim 7 wherein:
the end plate is a heat shield; and
the member is a spreader welded to the heat shield between the first edges of the first and second elements.

9. The seal of claim 8 wherein:
the spreader has a thickness greater than thicknesses of the heat shield and the first and second elements.

10. The seal of claim 7 wherein:
the end plate is a heat shield; and
the member is a spreader welded to the heat shield between the first edges of the first and second elements.

11. The seal of claim 10 wherein:
in cross-section, the heat shield has an indentation along the leg.

12. The seal of claim 1 wherein:
in cross-section, the end plate is formed as a modified obround, first and second elements passing through the gap; and
in cross-section, the member is formed as a modified obround having a gap along one leg aligned with the gap of the end plate.

13. The seal of claim 12 wherein:
along the other leg of the member cross-section, said other leg has a central bulge providing local contact with the end plate.

14. The seal of claim 13 wherein:
along the central bulge, the member is welded to the end plate.

15. The seal of claim 1 wherein:
the first element and second element are formed of a nickel-based superalloy; and
the end plate and member are formed of a cobalt-based superalloy.

16. The seal of claim 8 wherein:
the first element and second element are formed of a nickel-based superalloy; and
the heat shield and spreader are formed of a cobalt-based superalloy.

17. The seal of claim 10 wherein:
in cross-section, the spreader is formed as a modified obround having a gap along one leg aligned with the gap of the heat shield.

18. The seal of claim 17 wherein:
along the other leg of the spreader, the spreader has a central bulge, the weld between the spreader and heat shield being along said bulge.

19. The seal of claim 1 wherein:
the member contacts the portions of the first and second elements; and
the end plate contacts the portions of the first and second elements.

20. The seal of claim 19 wherein:
the portions of the first and second elements are each an end convolution of the respective associated bellows cross-section.
21. The seal of claim 1 wherein:
the member contacts the first surface of the first element and the first surface of the second element; and
the end plate contacts the second surface of the first element and the second surface of the second element.
22. The seal of claim 8 wherein:
the spreader contacts the first surface of the first element and the first surface of the second element; and
the heat shield contacts the second surface of the first element and the second surface of the second element.
23. The seal of claim 1 wherein:
the first and second elements are neither welded to the member nor to the end plate.
24. The combination of claim 2 wherein:
the end plate contacts the one or more first environmental components; and
the first and second elements contact the one or more second environmental components.

* * * * *

UNITED STATES PATENT AND TRADEMARK OFFICE
CERTIFICATE OF CORRECTION

PATENT NO. : 7,451,989 B1  
APPLICATION NO. : 11/338975  
DATED : November 18, 2008  
INVENTOR(S) : Kenneth W. Cornett et al.

Page 1 of 1

It is certified that error appears in the above-identified patent and that said Letters Patent is hereby corrected as shown below:

Column 4, claim 10, lines 23 26,
"10. The seal of claim 7 wherein:
the end plate is a heat shield; and
the member is a spreader welded to the heat shield between the first edges of the first and second elements."

should read

--10. The seal of claim 8 wherein:
in cross-section, the heat shield is formed as a modified obround, the first and second elements passing through the gap.--

Column 4, claim 12, line 32, after "obround," --the-- should be inserted.

Signed and Sealed this

Thirteenth Day of January, 2009

JON W. DUDAS  
*Director of the United States Patent and Trademark Office*